United States Patent [19]

Pettit

[11] Patent Number: 4,922,587
[45] Date of Patent: May 8, 1990

[54] FASTENER CONSTRUCTION

[76] Inventor: Frederick M. Pettit, 1411 Point Abino Rd. S., Ridgeway, Ontario L0S 1N0, Canada

[21] Appl. No.: 267,302

[22] Filed: Nov. 4, 1988

Related U.S. Application Data

[63] Continuation-in-part of Ser. No. 216,508, Jul. 8, 1988, abandoned.

[51] Int. Cl.⁵ .................................................. A41F 1/00
[52] U.S. Cl. ........................................ 24/453; 24/573; 403/292; 411/508; 411/514
[58] Field of Search ................ 24/453, 573, 617, 618, 24/605, 616, 295, 297; 403/292, 297, 298; 411/508, 509, 510, 913, 61, 514, 182

[56] References Cited

U.S. PATENT DOCUMENTS

| 2,118,800 | 5/1938 | Smith | 24/573 X |
| 2,244,976 | 6/1941 | Tinnerman | 24/619 X |
| 3,139,768 | 7/1964 | Biersecker | 411/508 X |
| 3,221,572 | 12/1965 | Swick | 411/508 X |
| 4,068,346 | 1/1978 | Binder | 403/292 X |
| 4,484,407 | 11/1984 | Petersson | 403/292 X |

Primary Examiner—Laurie K. Cranmer
Attorney, Agent, or Firm—Joseph P. Gastel

[57] ABSTRACT

A fastener for entering holes in two adjacent bodies to hold them together and to be completely concealed therein including a flexible resilient tubular body having at least one locating tab centrally located thereon for determining the extent to which spaced portions of the tubular body on opposite sides of the locating tab may enter holes in the adjacent bodies, and resilient flexible locking tabs struck up from the spaced portions of the tubular body for retaining them within the adjacent bodies in which they are located.

12 Claims, 2 Drawing Sheets

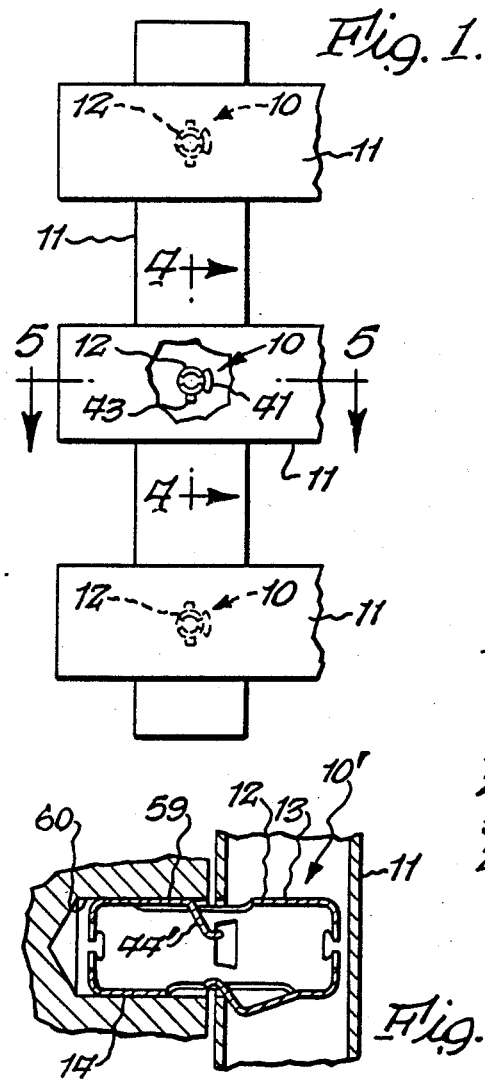
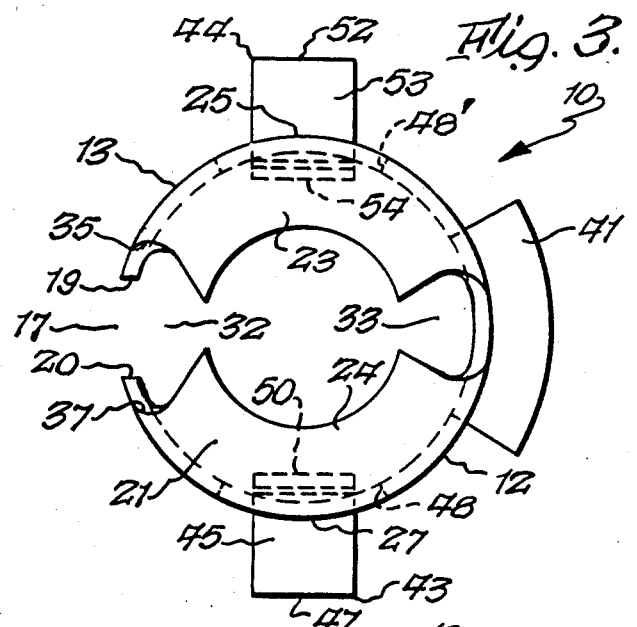
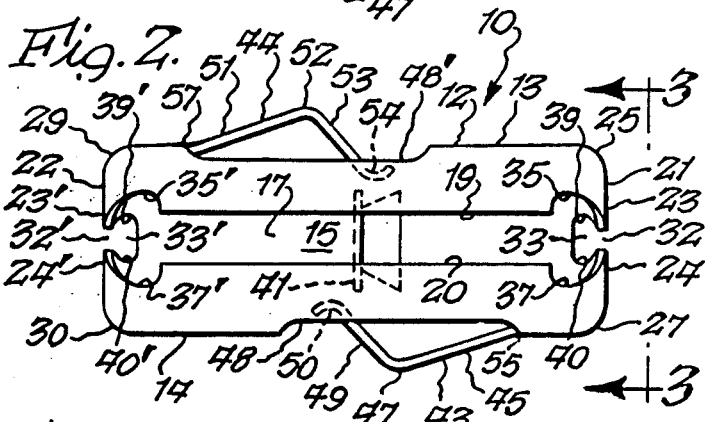
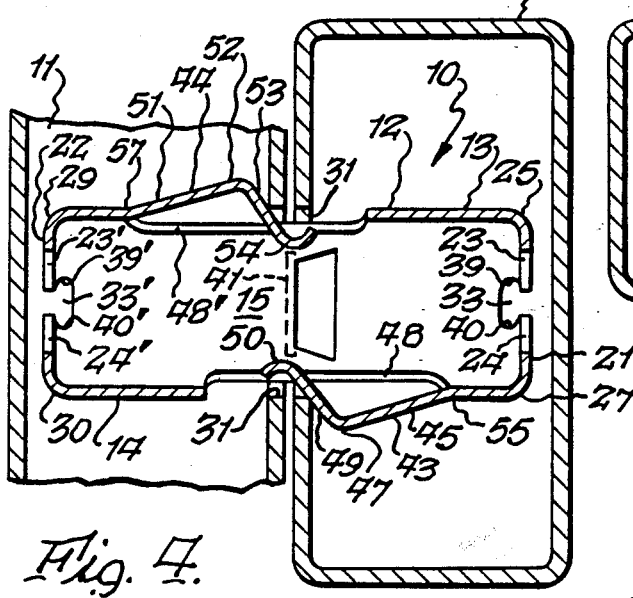
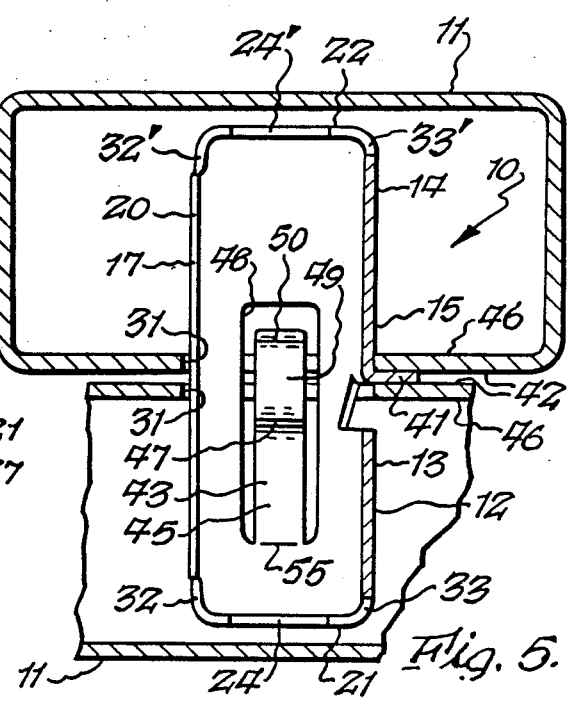

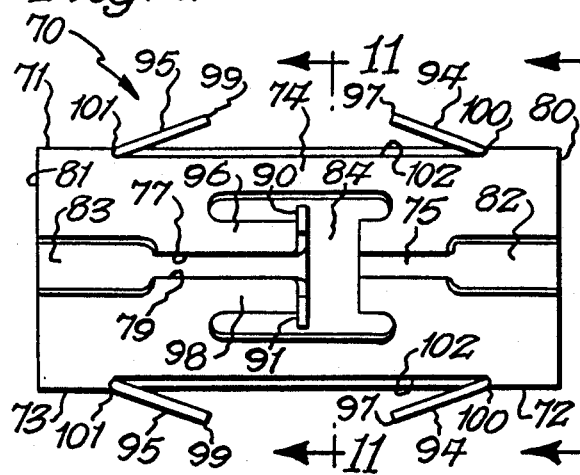
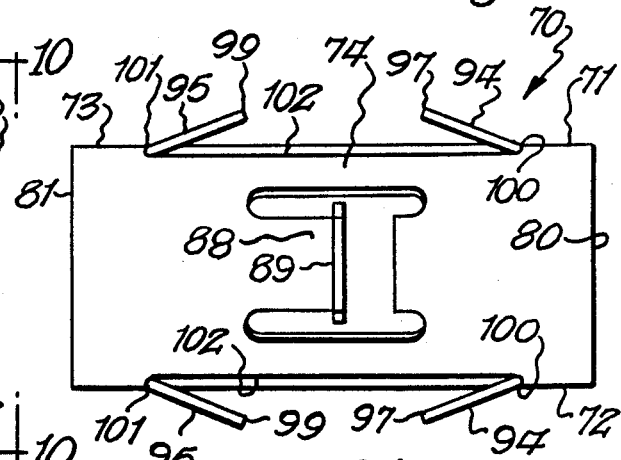
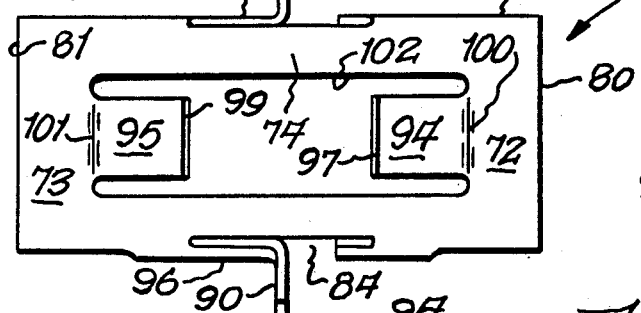
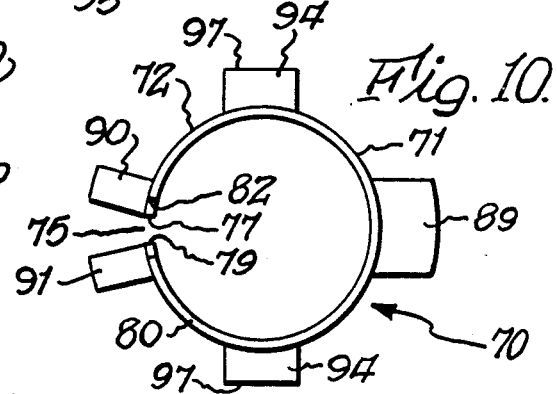
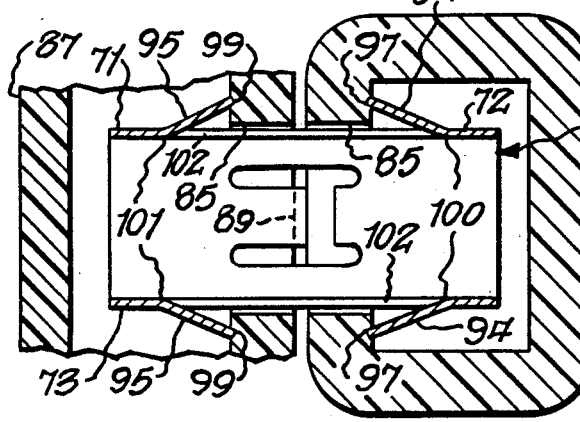
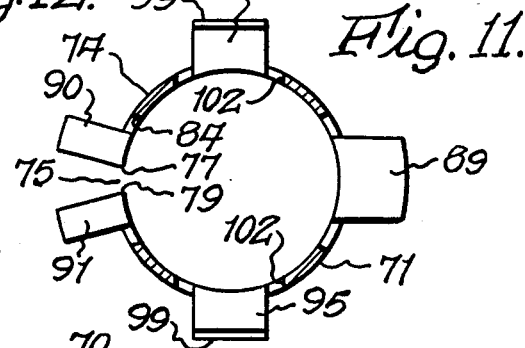
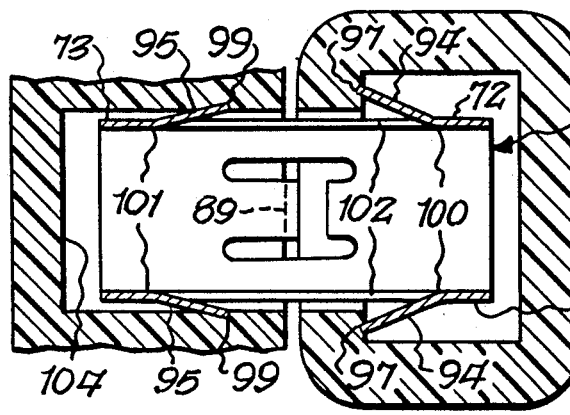
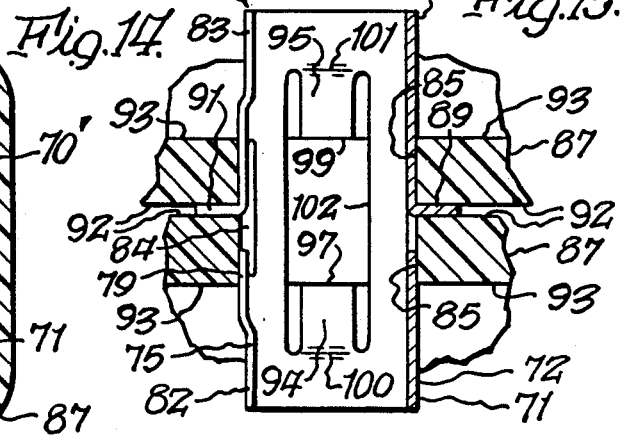

FASTENER CONSTRUCTION

CROSS REFERENCE TO RELATED APPLICATION

The present application is a continuation-in-part of application Ser. No. 216,508, filed July 8, 1988 now abandoned.

BACKGROUND OF THE INVENTION

The present invention relates to an improved fastener for fastening two members together without being visible.

By way of background, there are numerous instances wherein a fastener is required to fasten members having holes therein without the fastener being visible. One such instance is in fastening two hollow tubular members which form parts of a fence. It will be appreciated that there are also numerous other instances where a fastener of the type disclosed hereafter is required.

SUMMARY OF THE INVENTION

It is accordingly one object of the present invention to provide a highly simplified fastener which enters holes in two adjacent members to hold them together without being visible.

Another object of the present invention is to provide an improved fastener of the foregoing type which is fabricated simply and easily from sheet material.

A further object of the present invention is to provide a fastener of the foregoing type which is flexible and resilient so that it can be compressed to enter undersized holes.

Yet another object of the present invention is to provide a fastener of the foregoing type which has uniquely formed rounded ends which facilitate its entry into holes.

A still further object of the present invention is to provide an improved fastener of the foregoing type which contains a plurality of uniquely integrated features which not only permit the fastener to be fabricated in an expedient and economical manner but also cause it to be extremely simple and reliable in use. Other objects and attendant advantages of the present invention will readily be perceived hereafter.

The present invention relates to a fastener for fastening first and second members having first and second openings, respectively, comprising an elongated body having first and second spaced body portions, first and second ends on said first and second spaced body portions, respectively, and first and second locking tab means extending outwardly from said first and second spaced body portions, respectively, for retaining said first and second spaced body portions in said first and second members, respectively.

The various aspects of the present invention will be more fully understood when the following portions of the specification are read in conjunction with the accompanying drawings wherein:

BRIEF DESCRIPTION OF THE DRAWINGS

FIG. 1 is a fragmentary side elevational view, partially broken away, showing a plurality of hollow members fastened by the improved fasteners of the present invention;

FIG. 2 is a plan view of fastener of the present invention;

FIG. 3 is an enlarged end elevational view taken substantially in the direction of arrows 3—3 of FIG. 2;

FIG. 4 is a fragmentary cross sectional view taken substantially along line 4—4 of FIG. 1;

FIG. 5 is a fragmentary cross sectional view taken substantially along line 5—5 of FIG. 1;

FIG. 6 is a fragmentary cross sectional view substantially similar to FIG. 4 but showing one end of the fastener in a hole in a solid member;

FIG. 7 is a side elevational view of a modified embodiment of the fastener of the present invention;

FIG. 8 is a side elevational view of the fastener of FIG. 7 which has been rotated 180° about its longitudinal axis;

FIG. 9 is a side elevational view of the fastener of FIG. 7 which has been rotated 90° about its longitudinal axis;

FIG. 10 is an end elevational view taken substantially in the direction of arrows 10—10 of FIG. 7;

FIG. 11 is a cross sectional view taken substantially along line 11—11 of FIG. 7;

FIG. 12 is a fragmentary cross sectional view similar to FIG. 4 and showing a plurality of hollow members fastened by the improved fastener of FIGS. 7-11;

FIG. 13 is a view similar to FIG. 5 and showing how the locating tabs cooperate with the two members which are to be fastened; and FIG. 14 is a fragmentary cross sectional view similar to FIG. 12 but showing one end of the fastener in a hole in a solid member.

DESCRIPTION OF THE PREFERRED EMBODIMENTS

The improved fastener 10 of the present invention is intended to attach two pieces 11 of tubular material to each other in such a manner that the fastener will not show, thereby providing a very neat finish. The tubular members may be any type of plastic, metal or any other type of material.

The fastener 10 includes a generally tubular hollow shell-like cylindrical body 12 which is fabricated from spring steel, thereby making it flexible and resilient. It may be of any diameter and length as may be required for any application. Nominally it is intended to be approximately ¼ inch in diameter. The body 12 includes first and second spaced body portions 13 and 14 which are located on opposite sides of a central portion 15. An elongated slot 17 which is bounded by edges 19 and 20 extends throughout the entire body 12 and into ends 21 and 22. End 21 consists of inwardly bent flanges 23 and 24, and end 22 includes mirror-image counterparts 23' and 24' of flanges 23 and 24, respectively.

A rounded junction 25 is located between body portion 13 and flange 23. A rounded junction 27 is located between body portion 13 and flange 24. A rounded junction 29 is located between body portion 14 and flange 23'. A rounded junction 30 is located between body portion 14 and flange 24'. The rounded junctions 25, 27, 29 and 30 facilitate the entry of the fastener 10 into openings, such as 31 of hollow members 11 (FIG. 5). Furthermore, if the openings or holes 31 are of smaller diameter than the body of fastener 10, the slot 17 will permit flexible resilient body 12 to be compressed because edges 19 and 20 can approach each other.

Slots 32 and 33 exist in end 21 between flanges 23 and 24. Slots 32' and 33' are mirror-image counterparts of slots 32 and 33, respectively, and are located between flanges 23' and 24'. The slots permit the flanges to be bent into position from planar material during fabrication without buckling. The edges which border slot 32 are more distant from each other at 35 and 37 proximate the rounded junctions than at other locations to facilitate bending of flanges 23 and 24 to their final positions without buckling. The edges of slot 33 at 39 and 40 are also wider apart proximate the rounded junctions than at other locations for the same purpose. The edges of slot 32' at 35' and 37' and the edges of slot 33' at 39' and 40' are wider apart proximate the rounded junctions than at other locations as shown in the drawings to facilitate bending of flanges 23' and 24' to their final positions.

A locating tab 41 is struck up from central body portion 15 and it acts as a stop to prevent body portions 13 and 14 from entering its associated member 11 more than a predetermined amount by engaging the outer surfaces 42 of members 11 which are opposite to inner surfaces 46 of body members 11.

Locking tabs 43 and 44 are struck up from spaced body portions 13 and 14, respectively. Locking tab 43 includes a first portion 45 which is formed integrally with body portion 13, a bend 47, a portion 49 which extends transversely to portion 43, and a curved end portion 50. Locking tab 44 includes a portion 51 which is formed integrally with body portion 14, a bend 52, a portion 53, and a bent end 54. Locking tabs 43 and 44 are flexibly and resiliently attached to body portions 13 and 14, respectively, at areas 55 and 57, respectively, so that either body portion 13 or 14 can enter a hole, and during the entry process the locking tab 43 or 44 will pivot about area 55 or 57, respectively, and after bent portions 47 or 52 have passed the edges of the hole 31, the locking tabs 43 or 44 will spring back in the position shown in FIG. 4 to thereby retain the body portion of the fastener within the hollow body in which it is located. In its locking position, the portions 49 and 53 of the locking tabs each bears against the inside edge of the hole of the body in which it is located. As can be seen from FIG. 5, locking tab 43 is located in a window 48 and locking tab 44 is located in an analogous window 48' (FIG. 4). The dimensions and locations of the locking tabs may vary depending on the wall thicknesses of the members 11. In the foregoing respect the inclined tab portions 49 and 53 will always engage the inner edges of holes 31, but the exact point of engagement on portions 49 and 53 will depend on the diameters of the holes. Thus a fastener 10 can be used in two adjacent holes of different diameter. In the foregoing respect, it will be appreciated that locking tabs 43 and 44 are bent outwardly a sufficient amount so that the foregoing mode of operation can be realized.

The fastener 10 of the present invention can be fabricated by a plurality of simple fabrication techniques comprising die cutting a suitable blank from sheet material and thereafter bending it to the configuration shown by rolling it to a tubular shape, bending the locking tabs outwardly, and thereafter bending the ends inwardly to form the flanges and rounded junctions at the ends.

In FIG. 6 a modified form 10' of a fastener is shown which is identical in all respects to the fastener 10 described above except that the surface 59 of locking tab 44' includes a friction material so as to lock it within a blind bore 60.

In FIG. 7-14 a modified embodiment of the present invention is disclosed. The fastener 70 includes a generally tubular hollow shell-like cylindrical body 71 which is fabricated from spring steel, thereby making it flexible and resilient. It may be of any diameter and length as may be required for any application. Nominally it is intended to be approximately ¼ inch in diameter. The body 71 includes first and second spaced body portions 72 and 73 which are located on opposite sides of a central portion 74. An elongated slot 75, which is bounded by edges 77 and 79, extends throughout the entire body 71 and terminates at ends 80 and 81 of body 71. Slot 75 includes enlarged portions 82 and 83 and an enlarged central opening 84. If the openings or holes 85 of members 87 into which fastener 70 fits are smaller than the outside diameter of the fastener, the slot 75 will permit flexible resilient body 71 to be compressed because edges 77 and 79 can approach each other.

Locating tabs 89, 90 and 91 are struck up from central body portion 74 and they act as stops to prevent body portions 72 and 73 from entering their associated members 87 more than a predetermined amount by engaging the outer surfaces 92 (FIG. 13) of members 87 which are opposite to inner surfaces 93 of body members 87. Locating tab 89 is bent outwardly from base portion 88 located in window 86. Locating tabs 90 and 91 are bent outwardly from base portions 96 and 98, respectively, which are located in opening 84.

Locking tabs 94 and 95 are struck up from spaced body portions 72 and 73, respectively. Locking tabs 94 and 95 terminate at ends 97 and 99, respectively. Ends 97 and 99 are not rounded, as in the corresponding structure of the previous embodiment, and thus they will tend to dig into the walls of members 87 after they have entered them. Locking tabs 94 and 95 are flexibly and resiliently attached to body portions 72 and 73, respectively, at areas 100 and 101, respectively, so that body portions 72 or 73 can enter a hole, and during the entry process the locking tabs 94 or 95 will pivot about areas 100 or 101, respectively, and after ends 97 or 99 have passed the edges of the holes 85, the locking tabs 94 or 95 will spring back to the positions shown in FIG. 12 to thereby retain their body portions within the hollow bodies in which they are located. In their locking positions, the ends 97 and 99 of the locking tabs bear against the inside of the body in which they are located. As can be seen from FIG. 9, one pair of locking tabs 94 and 95 is located in a window 102, and the other pair of locking tabs 94 and 95 is located in an identical window. The dimensions and locations of the locking tabs may vary depending on the wall thicknesses of the members 87. A fastener 70 can be used in two adjacent holes of different diameter. In the foregoing respect, it will be appreciated that locking tabs 94 and 95 are bent outwardly a sufficient amount so that the foregoing mode of operation can be realized.

The fastener 70 of the present invention can be fabricated by a plurality of simple fabrication techniques comprising die cutting a suitable blank from sheet material and thereafter bending it to the configuration shown by rolling it to a tubular shape, and bending the locking and locating tabs outwardly.

In FIG. 14 a modified form 70' of a fastener is shown which is identical in all respects to the fastener 70 described above except that it is inserted into a blind bore 104.

The embodiment of FIGS. 7-14 has certain advantages over the embodiment of FIGS. 1-6. In this respect, it has four locking tabs 94 and 95, that is two pairs, with the tabs of each pair being diametrically opposite each other. In contrast, the embodiment of FIGS. 1-6 has only a total of two tabs, and they are not exactly opposite each other. Thus there is less tendency for fastener 70 to cock once it is installed, and further, there are four tabs for holding it in its installed position, which makes it less likely that it will be removed under applied stresses. Furthermore, the ends 97 and 99 are relatively sharp, that is, they are not rounded as are portions 47 and 52 of FIGS. 1-6. Therefore, tabs 94 and 95 will tend to bite into their associated members, and thus will be less likely to slip out. In FIGS. 7-14, the rounded ends 22 and 23 of FIGS. 1-6 have been eliminated, and thus the fastener is cheaper to fabricate. Additionally, the embodiment of FIGS. 7-14 has three locating tabs 89, 90 and 91 whereas the embodiment of FIGS. 1-6 has only one. Tabs 90 and 91 are substantially diametrically opposite to tab 89, and thus by bearing against their associated member 87, they will align the longitudinal axis of fastener 70 substantially perpendicularly to the surface of the member in which the hole 85 is located. Also the relatively sharp ends 97 and 99 will tend to dig into wood, plastic or other relatively soft material, especially in a blind bore, as in FIG. 14.

Each of the above embodiments of FIGS. 1-6 and FIGS. 7-14 has its own distinct advantage. The embodiment of FIGS. 1-6 can be removed from its associated members because of the rounded portions 47 and 52 which permit the tabs to spring back as the fastener is withdrawn. Thus they can provide a temporary joint. The advantage of the FIGS. 7-14 embodiment is that the tabs will bite into their associated members once they are installed and thus provide a permanent joint.

It is also to be noted that all the fasteners of the present invention are especially advantageous for use with hollow vinyl plastic tubing members which are used for fence slats and lattice work. In this respect, the holes in the vinyl will enlarge greatly with increases in temperature. Therefore, since the fasteners are flexible and resilient, as noted above, they can be compressed to a smaller diameter because of the existence of slot 75 (FIG. 7) and slot 17 (FIG. 2) and thus be placed in undersize holes in the slats. When these holes thereafter expand due to increases in temperature, the fasteners will also expand to maintain tight joints.

It can thus be seen that the various embodiments of the improved fastener of the present invention are manifestly capable of achieving the above enumerated objects, and while preferred embodiments of the present invention have been disclosed, it will be appreciated that it is not limitd thereto but may be otherwise embodied within the scope of the following claims.

What is claimed is:

1. A fastener for fastening first and second members having first sides which face each other and second sides which are on opposite sides of said members from said first sides, said first member having a first thickness between its first and second sides and said second member having a second thickness between its first and second sides, and first and second holes extending entirely through said first and second members, respectively, comprising a substantially hollow cylindrical body of flexible resilient spring metal having a longitudinal axis and first and second end portions on opposite sides of a central portion, elongated slot means extending continuously along the entire length of said body to permit portions of said body on opposite sides of said elongated slot means to approach each other when compressive forces are applied to said body because of the flexibility of said spring metal and to cause portions of said body on said opposite sides of said elongated slot means to recede when said compressive forces are removed from said body because of the resilience of said sheet metal, said flexibility of said sheet metal permitting said end portions to enter said holes when said holes are of a smaller diameter than said body, first and second cantilever locking tab means on said first and second end portions, respectively, having first and second outer ends, respectively, and first and second inner free ends, respectively, said first and second outer ends being formed integrally with said first and second end portions, respectively, at junctions with said first and second end portions, respectively, which are of substantially the same diameter as said body, said locking tab means except for said first and second outer ends being unattached to said body, said first and second locking tab means extending toward each other and flaring outwardly from said body as they approach said central portion, first and second tab ends on said first and second inner free ends of said first and second locking tab means, respectively, facing toward each other and lying on diameters which are greater than the diameter of said central portion and greater than the diameters of said first and second holes, respectively, and planar stop tab means bent outwardly from said central portion and lying between said first and second tab ends for lying in contiguous relationship to said first sides of said first and second members, said planar tab means having opposite sides for providing abutments for each of said first sides of each of said first and second members, said first and second tab ends being spaced from each other an amount which is at least as great as the total of said first and second thicknesses and the space occupied by said stop tab means to thereby hold said first and second members in assembled relationship when said first and second end portions are located outwardly beyond said second sides of said first and second members with said first and second tab ends facing said second sides, and when said planar stop tab means are located between said first sides of said first and second members.

2. A fastener as set forth in claim 1 wherein said first and second locking tab means each comprise a pair of said locking tab means with each one of said pair being located in diametrically opposed relationship to the other of said locking tab means of said pair.

3. A fastener as set forth in claim 1 wherein said first and second locking tab means each comprise first and second locking tabs, respectively, on opposite sides of said elongated slot means.

4. A fastener as set forth in claim 1 wherein said stop tab means comprise a plurality of stop tabs circumferentially located on said central portion.

5. A fastener as set forth in claim 4 wherein said plurality of stop tab means comprise a first stop tab on said body on the opposite side thereof from said elongated slot means and at least one second stop tab on the opposite side of said body from said first stop tab.

6. A fastener as set forth in claim 4 wherein said plurality of stop tabs comprise two first stop tabs adjacent said elongated slot and on opposite sides thereof, and a second stop tab on the opposite side of said body from said two first stop tabs.

7. In combination, a fastener and first and second substantially planar members having first sides which face each other and second sides which are on opposite sides of said members from said first sides, said first member having a first thickness between its first and second sides and said second member having a second thickness between its first and second sides, and first and second holes extending entirely through said first and second members, respectively, said fastener comprising a substantially hollow cylindrical body of flexible resilient spring metal having a longitudinal axis and first and second end portions on opposite sides of a central portion, elongated slot means extending continuously along the entire length of said body to permit portions of said body on opposite sides of said elongated slot means to approach each other when compressive forces are applied to said body because of the flexibility of the spring metal and to cause said portions of said body on said opposite sides of said elongated slot means to recede when said compressive forces are removed from said body because of the resilience of said sheet metal, said flexibility of said sheet metal permitting said end portions to enter said holes when said holes are of a smaller diameter than said body, first and second cantilever locking tab means on said first and second end portions having first and second outer ends, respectively, and first and second inner ends, respectively, said first and second outer ends being formed integrally with said first and second end portions, respectively, at junctions which are of substantially the same diameter as said body, and the remainder of said locking tab means being unattached to said body, said first and second locking tab means extending toward each other and flaring outwardly from said body as they approach said central portion, first and second tab ends on said first and second inner free ends of said first and second locking tab means, respectively, facing toward each other and lying on diameters which are greater than the diameter of said central portion and greater than the diameters of said first and second holes, respectively, and planar stop tab means bent outwardly from said central portion and lying between said first and second tab ends for lying in contiguous relationship to said first sides of said first and second members, said planar tab means having opposite sides for providing abutments for each of said first sides of each of said first and second members, said first and second tab ends being spaced from each other an amount which is substantially the total of said first and second thicknesses and the space occupied by said stop tab means to thereby hold said first and second members in assembled relationship when said first and second end portions are located outwardly beyond said second sides of said first and second members with said first and second tab ends substantially engaging said second sides, and when said planar stop tab means are located between said first sides of said first and second members and are in substantially abutting relationship therewith.

8. A combination as set forth in claim 7 wherein said first and second locking tab means each comprise a pair of said locking tab means with each one of said pair being located in diametrically opposed relationship to the other locking tab means of said pair.

9. A combination as set forth in claim 7 wherein said first and second locking tab means each comprise first and second locking tabs, respectively, on opposite sides of said elongated slot means.

10. A combination as set forth in claim 7 wherein said stop tab means comprise a plurality of stop tabs circumferentially located on said central portion.

11. A combination as set forth in claim 10 wherein said plurality of stop tabs comprise a first stop tab on said body on the opposite side thereof from said elongated slot means and at least one second stop tab on the opposite side of said body from said first stop tab.

12. A combination as set forth in claim 10 wherein said plurality of stop tabs comprise two first stop tabs adjacent said elongated slot and on opposite sides thereof, and a second stop tab on the opposite side of said body from said two first stop tabs.

* * * * *